United States Patent Office 3,360,762
Patented Dec. 26, 1967

3,360,762
ELECTRIC CABLE COUPLING
Karl Mohr, Aschaffenburg am Main, Germany, assignor to Desco-Werk Seger & Angermeyer KG., Ittersbach, near Karlsruhe, Germany, a German firm
Filed Mar. 25, 1966, Ser. No. 537,455
Claims priority, application Germany, Apr. 12, 1965, M 64,854
2 Claims. (Cl. 339—8)

ABSTRACT OF THE DISCLOSURE

A cable coupling for connecting relatively movable multiple-lead cables in which insulation coupling sleeves are telescoped into each other and define therebetween an annular space accommodating a plurality of current carrying bearings. Each of the bearings is formed by an inner and an outer cage ring and contact rollers therebetween. Said three elements of each bearing are held in contact engagement with each other by axially slotting the inner cage ring and biasing the slotted ring so that it exerts a radially outwardly directed pressure upon the contact rollers.

---

Figure 1:
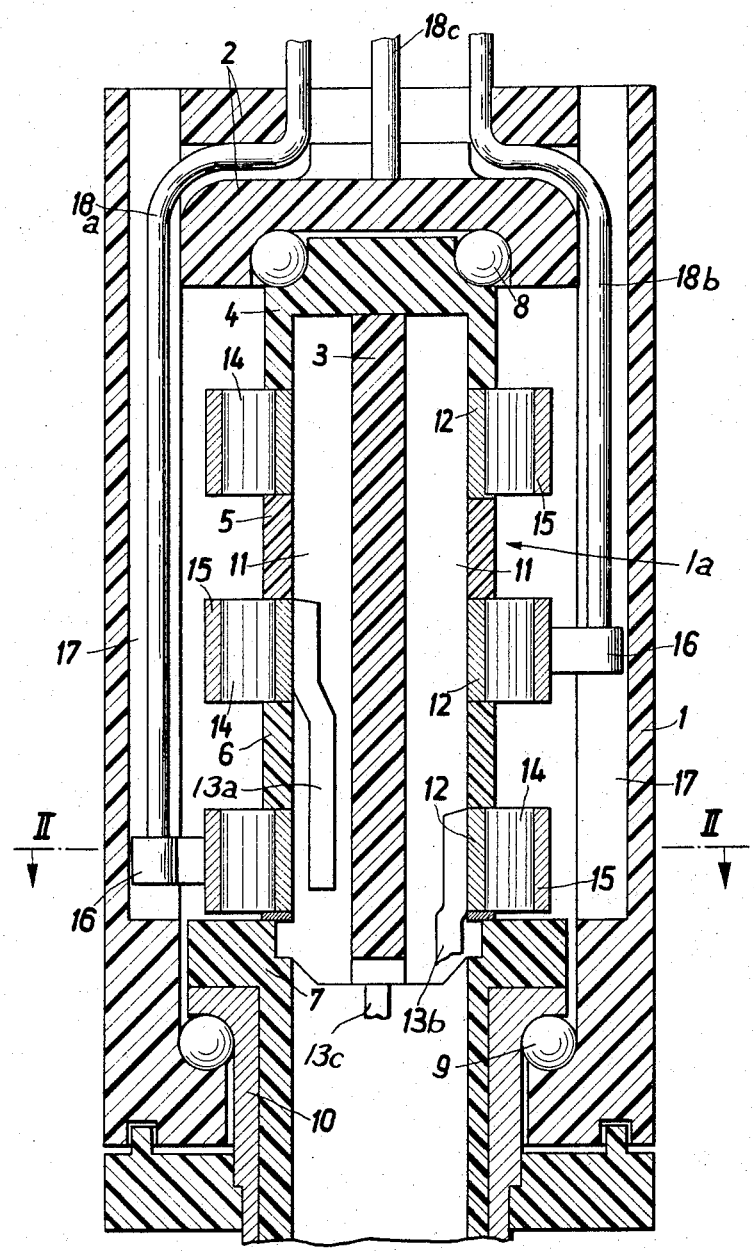

The present invention relates to a rotary electric cable coupling, and more particularly to a cable coupling in which an inner and an outer relatively rotatable coupling member are concentrically arranged, and current-transmitting elements are disposed between the two coupling members.

There are known couplings of the general kind above referred to, for instance, from applicant's prior Patent 3,195,094, which comprise an inner coupling member in the form of several lengthwise aligned insulation sleeves rotatable in an outer sleeve coaxially therewith. Bearings for transmitting mechanical loads only and current-transmitting bearings are provided between the two coupling members, each of the current transmitting bearings being disposed between two adjacent sleeves of the inner coupling member.

Several coupling structures have been proposed for the purpose of reducing the bulk and weight of couplings of this kind as heretofore known.

One of these proposals which is particularly suitable for couplings designed for an intermittent operation at a low rate of rotation, resides in providing as current-carrying bearings an inner cage sleeve and an outer cage sleeve between which are retained rollable contact elements, such as needles or rollers, preferably made of non-magnetic material. The outer cage sleeve of each bearing is lengthwise slotted and radially pressed together by an encompassing springy ring or a coil spring to assure adequate contact pressure between the sleeves and the rollable elements of the bearings. An arrangement of this kind permits a reduction of the outer diameter of the coupling; that is, it results in a slimming thereof.

It is a general object of the invention to provide a cable coupling of the general kind above referred to which is further improved with respect to its dimensions and efficiency.

A more specific object of the invention is to provide a cable coupling of the general kind above referred to which is simplified in construction and reduced in its outer diameter by eliminating the outer springy rings or coil springs required in couplings as heretofore known for the purpose aforesaid.

The aforementioned objects, features and advantages and other objects, features and advantages which will be pointed out hereinafter are attained by slotting the inner cage sleeve while leaving continuous the outer cage sleeve and outwardly biasing the slotted sleeve so that it applies radial pressure upon the bearing elements between the sleeves, thereby assuring a satisfactory low contact resistance between the cage sleeves and the bearing elements therebetween. Such outward bias may be obtained by using for the inner cage sleeve a sleeve material which has a high internal pre-tensioning, thereby causing the sleeve to spread outwardly when it is slotted.

In the accompanying drawing a preferred embodiment of the invention is shown by way of illustration, and not by way of limitation.

Figure 2:
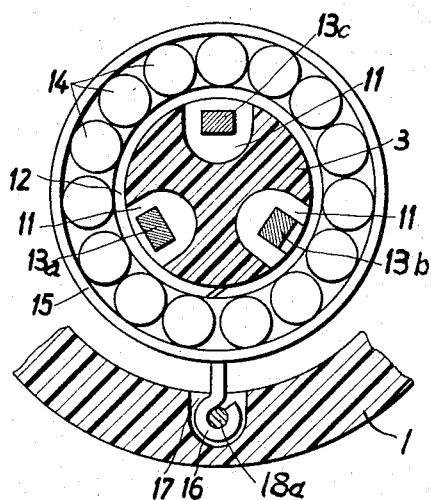

In the drawing:

FIG. 1 is an elevational vertical section through an electric cable coupling in accordance with the invention; and FIG. 2 is a section taken on line II—II of FIG. 1.

Referring now to the figures in detail, the exemplified cable coupling comprises an outer coupling member in the form of a one-piece insulation sleeve 1 closed off at one end by a cover 2, and an inner generally sleeve-shaped coupling member 1a formed of superimposed insulation sleeve sections 4, 5, 6 and 7. The inner coupling member and the outer coupling member are rotatable relative to each other in concentric relationship. An insulation body 3 is disposed within sleeve sections 4 to 7 and formed with three lengthwise grooves 11, as is best seen in FIG. 2.

To facilitate rotation of the coupling members relative to each other, bearings comprising balls 8 and 9 are provided between the two coupling members. A bearing bushing 10, preferably made of steel, is provided between sleeve section 7 and outer coupling member 1. Bearings 8 and 9 serve to take up mechanical loads only.

Current is transmitted by current-transmitting bearings disposed between adjacent sleeve sections. Each of the current transmitting bearings comprises an inner current-conducting sleeve shaped cage ring 12 and an outer current-conducting sleeve shaped cage ring 15. Contact rollers 14, preferably made of a non-magnetic metal, are disposed between the inner and outer cage rings. As is evident, insulation sleeve sections 4, 5 and 6 constitute spacers for cage sleeves 12 of the current-conducting bearings.

Inner rings 12 are connected to lead-in wires 13a, 13b and 13c. Similarly, outer rings 15 are connected to lead-out wires 18a, 18b and 18c. As is evident, the terms "lead-in" and "lead-out" wires are used merely for convenience. Each outer ring 15 has a radially extending protrusion 16 which engages in a lengthwise groove 17 in the inner wall of coupling member 1, as can best be seen in FIG. 2, thereby securing rings 15 against rotation in reference to coupling member 1.

The outer rings 15 are continuous or closed rings, while the inner sleeves 12 are lengthwise slotted, as is clearly shown in FIG. 2. Moreover, the slotted rings are outwardly biased so that they will tend to spread somewhat, thereby assuring satisfactory contact pressure between rings 12, contact rollers 14 and rings 15. The outward bias of inner rings 12 can be readily obtained by making these rings of a material having a high internal pre-tension. A ring made of such material will tend to spread slightly when slotted.

As is evident, the number of current-transmitting bearings must be selected in accordance with the number of phases of the current which is to be conducted through the coupling. Moreover, the gauge of the wires must be selected in accordance with the amperage of the current.

While the invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A cable coupling for electrically connecting two relatively rotatable multiple-lead cables, said coupling comprising an outer and an inner substantially sleeve-shaped insulation coupling member concentrically arranged one within the other and radially spaced apart to define an annular space therebetween, the inner coupling member being composed of several superimposed generally sleeve-shaped sections rotatable in unison; and a plurality of current-carrying bearings corresponding in number to the number of cable leads to be connected by the coupling, each of said bearings including an inner electrically conductive sleeve-shaped cage ring secured between two adjacent insulation sleeve sections and an outer electrically conducting sleeve-shaped cage ring disposed in said annular space juxtaposed to the inner cage ring, and cylindrical contact rollers interposed between each juxtaposed inner and outer cage ring in engagement therewith, the outer cage ring of each bearing being engaged with the outer coupling member for retention by the same, and the inner cage ring of each bearing having a single lengthwise slot and being outwardly biased to exert a radially directed outward pressure upon the respective contact rollers, thereby maintaining contact pressure between the rings and rollers of the bearings.

2. A cable coupling according to claim 1, wherein the slotted inner cage ring of each bearing is made of pretensioned material causing outward spreading of said ring.

References Cited

UNITED STATES PATENTS

| 1,178,267 | 4/1916 | Scheel | 339—8 |
| 1,493,859 | 5/1924 | Himes | 339—5 |
| 2,726,371 | 12/1955 | Seeloff | 339—5 |
| 3,021,497 | 2/1962 | Riley | 339—5 |

FOREIGN PATENTS 930,112   7/1963   Great Britain.

MARVIN A. CHAMPION, *Primary Examiner.*

PERRY TEITELBAUM, *Assistant Examiner.*